(12) United States Patent
Barnes et al.

(10) Patent No.: US 7,680,899 B1
(45) Date of Patent: Mar. 16, 2010

(54) SEAMLESS RETRIEVAL OF NON-STANDARD ITEMS FOR A MOBILE DEVICE

(75) Inventors: James D. Barnes, Overland Park, KS (US); Sanjay K. Sharma, Olathe, KS (US); Peter H. Distler, Overland Park, KS (US); Devon L. Biere, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 904 days.

(21) Appl. No.: 11/433,301

(22) Filed: May 12, 2006

(51) Int. Cl.
*G06F 15/16* (2006.01)
(52) U.S. Cl. .................. 709/217; 709/219; 709/232
(58) Field of Classification Search .............. 709/232, 709/217, 219
See application file for complete search history.

(56) References Cited

U.S. PATENT DOCUMENTS

| | | | |
|---|---|---|---|
| 5,918,014 A | 6/1999 | Robinson | |
| 5,937,392 A * | 8/1999 | Alberts | 705/14 |
| 6,202,023 B1 | 3/2001 | Hancock et al. | |
| 6,332,127 B1 | 12/2001 | Bandera et al. | |
| 6,862,575 B1 | 3/2005 | Anttila et al. | |
| 7,143,143 B1 * | 11/2006 | Thompson | 709/217 |
| 2002/0010627 A1 * | 1/2002 | Lerat | 705/14 |
| 2006/0085517 A1 * | 4/2006 | Kaurila | 709/217 |
| 2007/0005647 A1 * | 1/2007 | Cugi et al. | 707/104.1 |
| 2007/0100963 A1 * | 5/2007 | Ban et al. | 709/217 |

FOREIGN PATENT DOCUMENTS

WO     WO 0116853 A1 *    3/2001

OTHER PUBLICATIONS

Patent application entitled "Method and System Using Location History for Targeted Coupon Distribution," filed May 17, 2000, as U.S. Appl. No. 09/572,282.
Patent application entitled "Method and System for Facilitating Determination of Call-Drop Locations in a Wireless Network," filed Sep. 9, 2003, as U.S. Appl. No. 10/658,353.
Patent application entitled "Seamless Retrieval of Non-Standard Items for a Mobile Device," filed May 12, 2006, as U.S. Appl. No. 11/433,301.

* cited by examiner

*Primary Examiner*—Ario Etienne
*Assistant Examiner*—Andrew Georgandellis

(57) ABSTRACT

Systems and methods for seamless retrieval of coupons and other non-standard items to a mobile device. Some method embodiments comprise: receiving a communication that specifies a user id and a coupon id, and storing the user id and a location of the coupon in a table in response to said receiving. A response to the communication is sent to the mobile device to invoke an application that accesses the table to determine the coupon location and uses the coupon location to download the content. The communication may be a web page request from a browser on the mobile device, and the application may be a coupon organizer external to the web browser. The communication may further include origination information, so that once the retrieval is complete, the mobile device once again displays the original web page and the user is given the perception that the download was accomplished within the browser.

13 Claims, 5 Drawing Sheets

SEAMLESS RETRIEVAL OF NON-STANDARD ITEMS FOR A MOBILE DEVICE

CROSS-REFERENCE TO RELATED APPLICATIONS

This application includes subject matter related to the following applications, each of which is hereby incorporated by reference:

U.S. patent application Ser. No. 11/403,614, filed Apr. 13, 2006, entitled "Mobile-Device-Based Coupon Management Systems and Methods," by James Barnes, et al.

U.S. patent application Ser. No. 11/405,195, filed Apr. 17, 2006, entitled "Dynamic Advertising Content Distribution and Placement Systems and Methods," by James Barnes, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising and marketing professionals seek to reach consumers in new and innovative ways. With the widespread use of wireless communication devices and continuing advances in handset technology, new advertising avenues are becoming readily available. For example, many mobile devices are equipped with software that enables the devices to access the web to retrieve information desired by the user. Such information may be accompanied by various forms of advertisement. For example, users may retrieve Internet web pages that provide news, weather, traffic, and/or sports information of interest. Such web pages may include banner ads to promote the sponsors of those web pages. Other forms of advertising include animations, interactive "games", and musical themes.

It would be desirable to enable advertisers to reward consumers for their attention to such advertisements. For example, advertisers may wish to provide coupons, "desktop themes", puzzles, or other rewards for experiencing the advertisement. If such rewards are not a standard item (e.g., an "http" web page, a "jad" application, or a "gcd" ringer), there exists no seamless way for the user to obtain the item. In other words, the user cannot, by simply selecting an ad, cause a non-standard item to be downloaded by the mobile device. Unlike desktop computers, mobile devices do not uniformly employ full-function, standard-compliant web browsers. Thus mobile devices generally do not support a uniform "download" protocol that enables newly-conceived items to be downloaded to the mobile device for use by different applications.

SUMMARY

Accordingly, disclosed herein are systems and methods for seamless retrieval of coupons and other non-standard items to a mobile device. Some method embodiments comprise: receiving a communication that specifies a user id and a coupon id, and storing the user id and a location of the coupon in a table in response to said receiving. A response to the communication is sent to the mobile device to invoke an application that accesses the table to determine the coupon location and uses the coupon location to download the content. The communication may be a web page request from a browser on the mobile device, and the application may be a coupon organizer external to the web browser. The communication may further include origination information, so that once the retrieval is complete, the mobile device once again displays the original web page and the user is given the perception that the download was accomplished within the browser.

BRIEF DESCRIPTION OF THE DRAWINGS

For a more complete understanding of the present disclosure and the advantages thereof, reference is now made to the following description and the accompanying drawings, wherein like reference numerals represent like parts.

DETAILED DESCRIPTION

The present disclosure concerns various systems and methods for seamless retrieval of coupons and other non-standard items to a mobile device. Because mobile devices have limited power and hardware resources, the software that resides on such devices may lack features present in desktop computer systems. In particular, web browsers on such devices may be configured to download ringers, photos, and other standardized content, but they generally lack any ability to directly download newly-developed, non-standard items such as coupons, or alternatively, the ability to pass parameters to external applications in a standardized manner. In other words, mobile device web browsers are limited in functionality and they do not support many features that one would expect to find on a desktop web browser. In time, it may be expected that mobile device web browsers will provide such functionality as a matter of course, but in the meantime, service providers are handicapped by the inability to automatically download non-standard items for use by mobile devices. Waiting until such functionality is standard and widespread will certainly cause service providers to lose the race to market for newly-developed content that attracts customers. Accordingly, the systems and methods disclosed herein provide a work-around, i.e., an ability to download non-standard items without requiring modifications to the existing browser software.

These systems and methods involve an originating web page with a link that (when selected) directs a web-browser to a predetermined server. The predetermined server receives and stores information encoded in the URL of a page request, and responds with a page that invokes download software external to the browser without attempting to pass any parameters. The download software may be a JAVA program that is invoked by a "midlet://" tag in the page. The download software accesses the predetermined server to retrieve the stored information, which preferably includes a URL for the desired (non-standard) item and a URL for an originating page. The download software retrieves the non-standard item to the mobile device and deploys it in accordance with its extension (e.g., a .cpn file is added to the local coupon database). Thereafter, the download software calls the web browser with the URL for the originating web page, causing the web browser to show the originating web page. In this manner, the user is given the perception that the download was accomplished by the web browser, even though in fact it was accomplished by software external to the browser. As new, non-standard items are developed, the external download software is updated (or an additional download application is added), but the browser software is left untouched. These systems and methods enable quick deployment of newly-developed content to mobile devices, thereby enabling service providers to more efficiently compete for customers.

Figure 1:
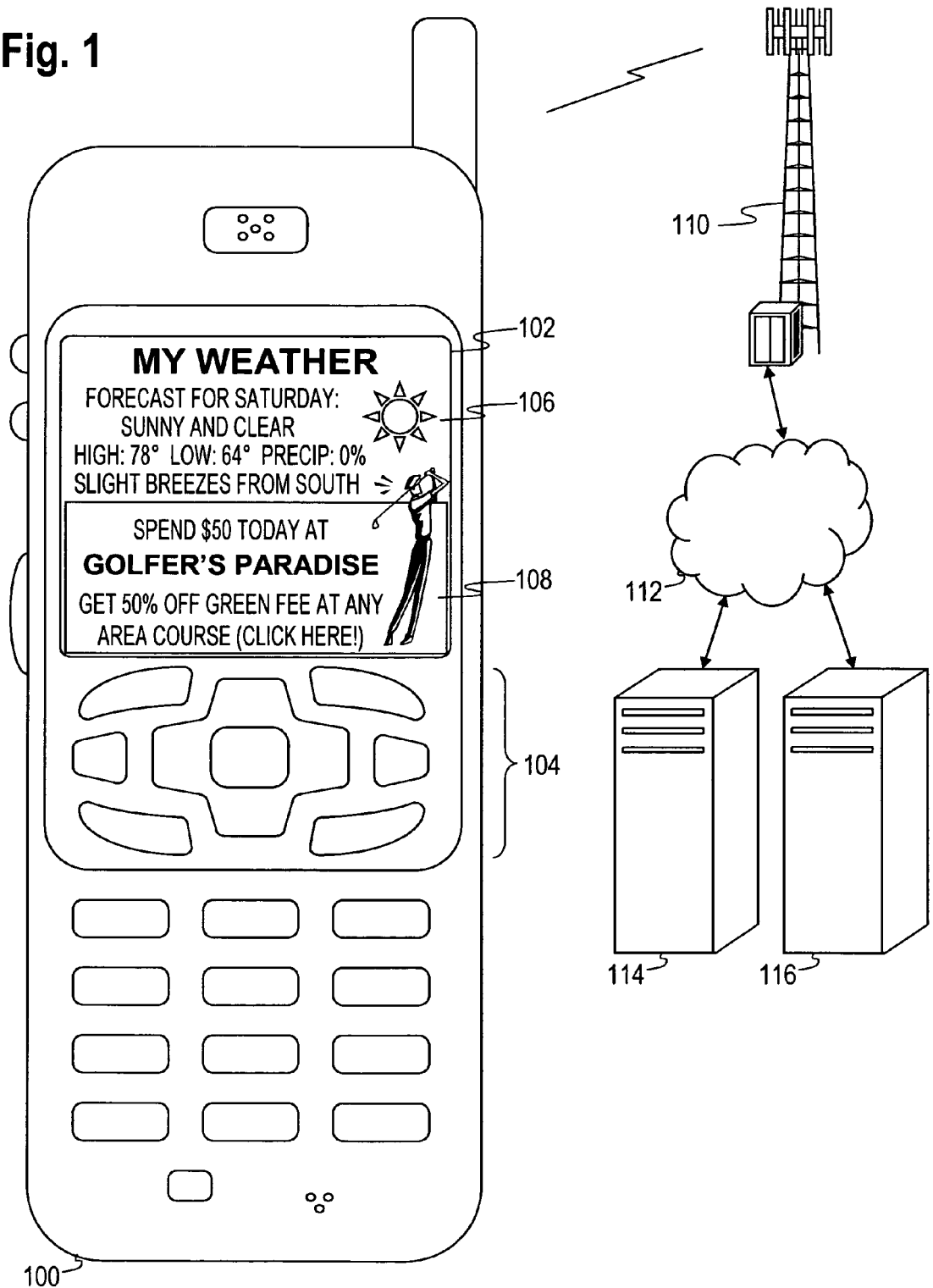
FIG. 1 shows an illustrative wireless communications system.

FIG. 1 shows a wireless communications system including an illustrative mobile device 100. Though illustrated as a mobile phone, device 100 may take various forms including a personal digital assistant (PDA), a mobile computer, a digital camera, a digital music player, a digital calculator, and an electronic key fob for keyless entry. Many suitable mobile devices combine some or all of these functions. In some preferred implementations, the mobile device is not a general purpose computing device like a notebook or tablet computer, but rather is a special-purpose communications device such as a mobile phone, pager, or PDA.

Mobile device 100 includes a display 102 and a touch-sensitive surface or keys 104 with which to interact with the user. The mobile device may present options for the user to select, controls for the user to actuate, and/or cursors or other indicators for the user to direct. The mobile device may further accept data entry from the user, including numbers to dial or various parameter values for configuring the operation of the mobile device. Mobile device 100 may further execute one or more software or firmware applications in response to user commands. These applications may configure the mobile device 100 to perform various customized functions in response to user interaction.

Among the various applications executable by the illustrative mobile device are a web browser and an electronic wallet. Shown on the display 102 is an illustrative web page 106 showing a weather forecast and an advertisement 108. The web page is obtained via wireless communications with a cell tower 110 or a wireless network access node. The cell tower 110 (or wireless network access node) is coupled to a wired network 112, such as the Internet. Via the wireless link and the wired network, the mobile device 100 has access to information on various servers 114, 116. One of the servers 114 may provide content such as, e.g., the weather forecast shown on display 102. Another server 116 may provide advertisements to the mobile device 100 for placement in advertising "spots", i.e., designated advertisement areas on web pages, splash screens, and in games. As described in a related application by James Barnes, et al., "Dynamic Advertising Content Distribution and Placement Systems and Methods", the advertisements may be managed by the mobile device to be relevant to the user and the context of the advertisement. As explained further below, the user, upon selecting an advertisement such as advertisement 108, automatically receives a coupon that is stored in an electronic wallet or coupon organizer for later retrieval and use.

Figure 2:
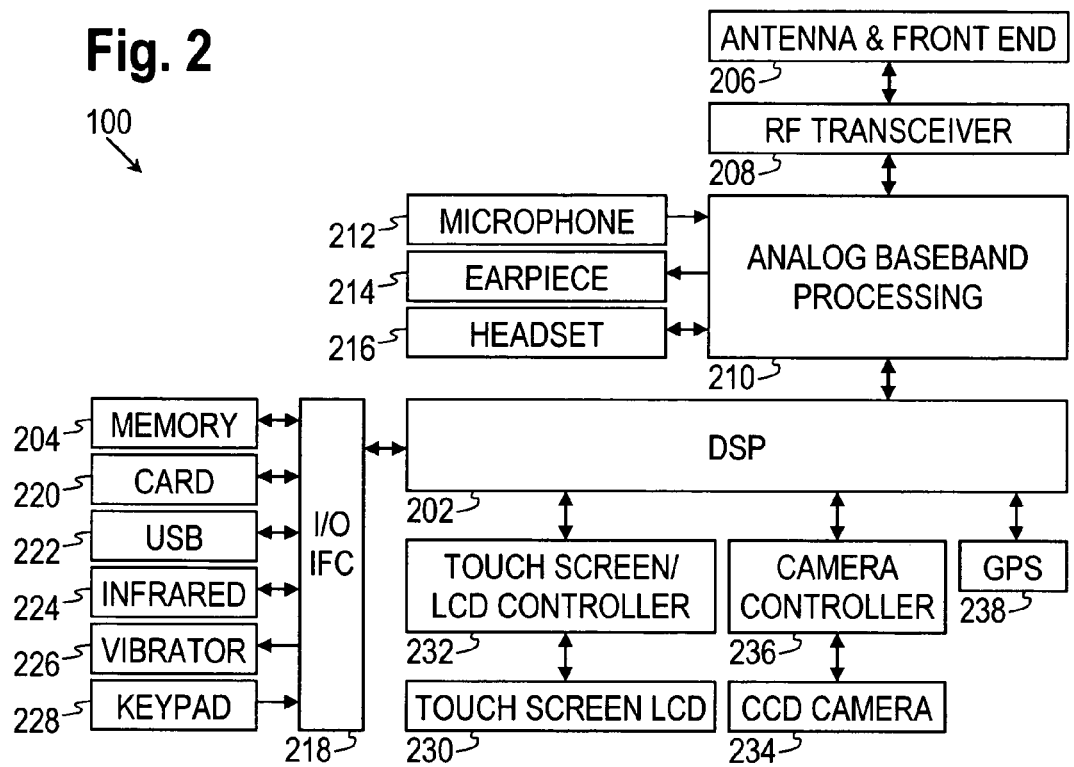
FIG. 2 shows a block diagram of an illustrative mobile device.

FIG. 2 shows a block diagram of illustrative mobile device 100. Mobile device 100 includes a digital signal processor (DSP) 202 and a memory 204. As shown, illustrative mobile device 100 may further include an antenna and front end unit 206, a radio frequency (RF) transceiver 208, an analog baseband processing unit 210, a microphone 212, an earpiece speaker 214, a headset port 216, an input/output interface 218, a memory card 220, a universal serial bus (USB) port 222, an infrared (IR) port 224, a vibrator 226, a keypad 228, a liquid crystal display (LCD) with a touch sensitive surface 230, a touch screen/LCD controller 232, a charge-coupled device (CCD) camera 234, a camera controller 236, and a global positioning system (GPS) sensor 238.

The DSP 202 or some other form of controller or central processing unit operates to control the various components of the mobile device in accordance with embedded software or firmware stored in memory 204. In addition to the embedded software or firmware, the DSP 202 may execute other applications stored in memory 204 or made available via information carrier media such as portable data storage media like memory card 220 or via wired or wireless network communications. The application software may comprise a compiled set of machine-readable instructions that configure the DSP to provide the desired functionality, or the application software may be high-level software instructions to be processed by an interpreter or compiler to indirectly configure the DSP.

An antenna and front end unit 206 may be provided to convert between wireless signals and electrical signals, enabling mobile device to send and receive information from a cellular network or some other available wireless communications network. The RF transceiver 208 provides frequency shifting, converting received RF signals to baseband and converting baseband transmit signals to RF. Analog baseband processing unit 210 may provide channel equalization and signal demodulation to extract information from received signals, may modulate information to create transmit signals, and may provide analog filtering for audio signals. To that end, the analog baseband processing unit 210 may have ports for connecting to a built-in microphone 212 and earpiece speaker 214 that enable the mobile device 100 to be used as a cell phone. The analog baseband processing unit 210 may further include a port for connecting to a headset or other hands-free microphone and speaker configuration.

DSP 202 may send and receive digital communications with a wireless network via analog baseband processing unit 210. In some embodiments, these digital communications may provide Internet connectivity, enabling a user to gain access to content on the Internet and to send and receive email or text messages. An input/output interface 218 interconnects the DSP 202 and various memories and interfaces. Memory 204 and removable memory card 220 may provide software and data to configure the operation of DSP 202. Among the interfaces may be a USB port 222 and an infrared (IR) port 224. The USB interface may enable the mobile device 100 to function as a peripheral device to exchange information with a personal computer or other computer system. The IR port 224 and other optional ports such as a Bluetooth interface or an IEEE 802.11 compliant wireless interface may enable the mobile device 100 to communicate wirelessly with other nearby mobile devices and/or wireless base stations. In some contemplated systems, the mobile device 100 is able to wirelessly exchange information at a point-of-sale when placed near a suitable transceiver.

Input/output interface 218 may further connect the DSP 202 to a vibrator 226 that, when triggered, causes the mobile device 100 to vibrate. The vibrator 226 may serve as a mechanism for silently alerting the user to any of various events such as an incoming call, a new text message, an appointment reminder, and newly-available coupons.

A keypad 228 couples to the DSP 202 via interface 218 to provide one mechanism for the user to make selections, enter information, and otherwise provide input to the mobile device 100. Another input mechanism may be a touch screen display 230, which may also display text and/or graphics to the user. A display controller 232 couples the DSP 202 to the touch screen display 230.

CCD camera 234 enables the mobile device 100 to take digital pictures. The DSP 202 communicates with the camera 234 via a camera controller 236. GPS sensor 238 is coupled to DSP 202 to decode global positioning system signals, thereby enabling the mobile device to determine its position. Various other peripherals may also be included to provide additional functions, e.g., radio and television reception.

Figure 3:
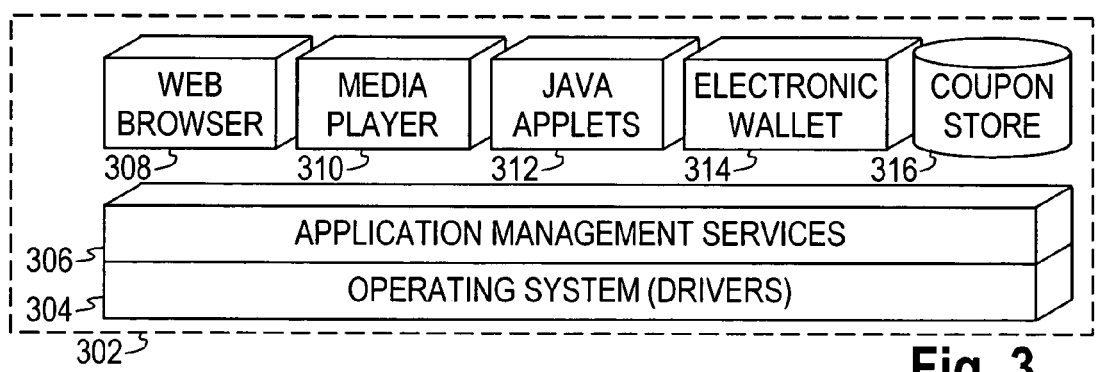
FIG. 3 shows a diagram of an illustrative software configuration for a mobile device.

FIG. 3 illustrates the software environment 302 that may be implemented by processor 202. The processor 202 executes operating system software 304 that provides a platform from which the rest of the software operates. Operating system software 304 provides drivers for the mobile device hardware with standardized interfaces that are accessible to application software. The operating system software 304 includes an application management system ("AMS") 306 that transfers control between applications running on the mobile device. Also shown in FIG. 3 are a web browser application 308, a media player application 310, another JAVA application 312, an electronic wallet application 314, and a coupon store database application 316. The web browser application 308 configures the mobile device to operate as a web browser, allowing a user to enter information into forms and select links to retrieve and view web pages. The media player application 310 configures the mobile device to retrieve and play audio or audiovisual media. Miscellaneous JAVA applications 312 may configure the mobile device to provide games, utilities, and other functionality.

In each of the applications 308-312, the user may be able to select a symbol or link to initiate the download of a coupon or other non-standard item to the mobile device. In the case of a coupon, the download process may cause the electronic wallet application 314 to process the coupon to store the relevant information in coupon store database 316. The coupon store database 316 may store coupon information (e.g., images, product/service name, value, and redemption rules) in an organized fashion to promote easy retrieval of coupons relevant to a given situation, e.g., a mobile device location, a time of day, and/or a user's search query. In some embodiments, the electronic wallet application may include processes for performing electronic transactions, background management, and providing a user interface.

The electronic wallet application may track financial account information necessary for the user to conduct electronic transactions on various accounts and to perform electronic payments at a point-of-sale. When performing such a payment, the electronic wallet application may perform a search of available coupons and incentives and may automatically apply the coupon or incentive to financial transactions to make the transaction most advantageous for the user. With regard to background management, the electronic wallet may monitor user activities and notify the user of relevant coupons.

Figure 4:
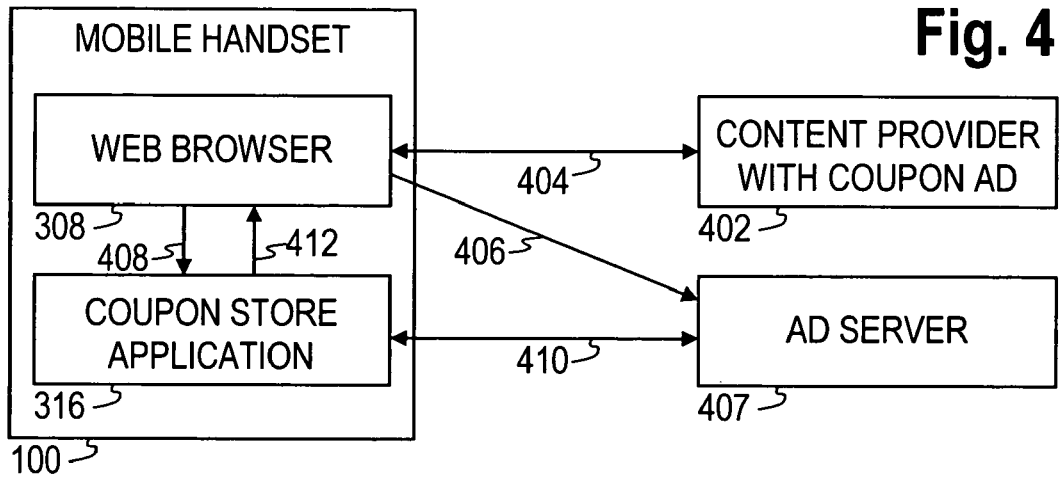
FIG. 4 shows a first system for seamless retrieval of non-standard items to a mobile device.

FIG. 4 shows a first system embodiment for seamless retrieval of non-standard items to a mobile device. A browser 308 on a mobile device 100 retrieves a web page from a content provider 402 as shown by arrow 404. When displayed on the mobile device 100, the web page displays an advertisement having an associated coupon. If the user selects the advertisement or in some fashion requests the coupon, the web browser requests a specified web page from the content provider 402, which logs the request and provides a response that re-directs the web browser to ad server 407. Alternatively, a link associated with the advertisement may directly specify a web page on the ad server 407.

The web browser 308 sends a page request 406 to ad server 407. The page request includes a uniform resource locator (URL) address that, in addition to specifying the address of ad server 407 and a coupon identifier, may also specify an address for the originating web page (i.e., the web page containing the advertisement). In some embodiments, a user identifier is also specified in the URL, though the user identifier may alternatively be available in a network communications packet header. Upon receiving the page request 406, the ad server 407 stores the user id, a coupon id or coupon address, and the originating web page address in a predetermined location, e.g., a database table indexed by the user id. The ad server 407 then responds to the page request 406 with a page having an applet invocation (e.g., "midlet://CouponStore.jar"). The page preferably also provides a message (e.g., "DOWNLOADING, Please Wait"). In some embodiments, the ad server 407 may be provided with restrictions to enforce so that, e.g., a given user is only allowed to download a given coupon once. In such embodiments, an alternative page may be provided to indicate when and why a coupon request has been denied.

Upon receiving the page having the applet invocation, the web browser 308 calls (arrow 408) the application management system 306 with the name of the applet, in this case "CouponStore.jar" or something similar. Most web browsers 308 do not support the passing of parameters to such applets. Upon being invoked, the coupon store application 316 connects to a coupon server process running on the ad server. While connecting, coupon store application 316 provides a user id to the coupon server process. The coupon server process accesses the predetermined location, e.g. the database table, based on the user id, and responsively provides a coupon address and an originating page address to the coupon store application 316. The coupon store application 316 uses the coupon address to retrieve the coupon from ad server 407. The coupon store application 316 stores the coupon information in an internal database, and calls (arrow 412) the application management system with the name of the browser, passing the originating web page address as a parameter. This call causes the web browser to start and load the originating web page, causing the user to perceive the download process as occurring entirely within the web browser.

Figure 5:
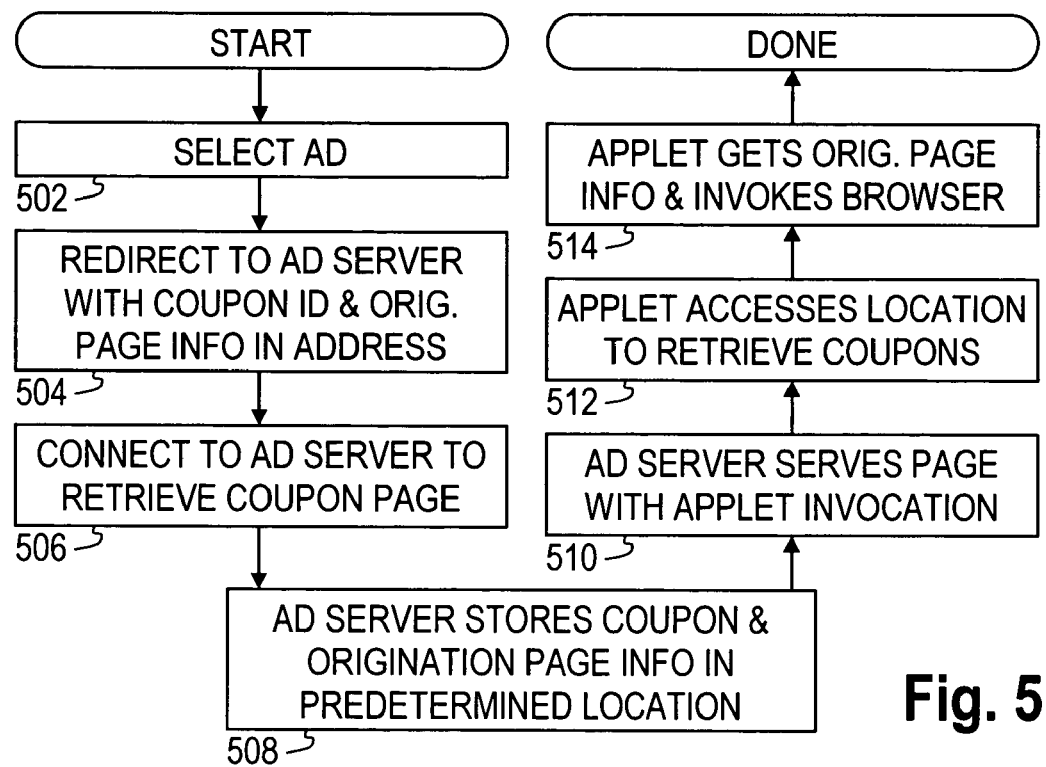
FIG. 5 shows a first method for seamless retrieval of non-standard items to a mobile device.

The foregoing process is shown as a flow diagram in FIG. 5. In block 502, a user selects an advertisement or requests a coupon in some fashion. This action causes the web browser to send a page request to the content provider 402. In block 504 the content provider sends a response, redirecting the web browser to the ad server with a URL that includes a coupon id and origination page info. In block 506, the web browser sends the URL in a page request to the ad server. Upon receiving the page request in block 508, the ad server stores the coupon and origination page information in a predetermined location, e.g., a database table on the ad server. In block 510, the ad server sends a response to the page request to the web browser, the response including an invocation of the coupon store application. The web browser transfers control to the coupon store application, which in block 512 accesses the predetermined location to obtain an address for the coupon, which is then used to download the coupon and store in a local database on mobile device 100. In block 514 the coupon store application further obtains origination page information from the predetermined location and returns control to the browser with the origination page address as a parameter. In this manner, a seamless user experience is provided.

Figure 6:
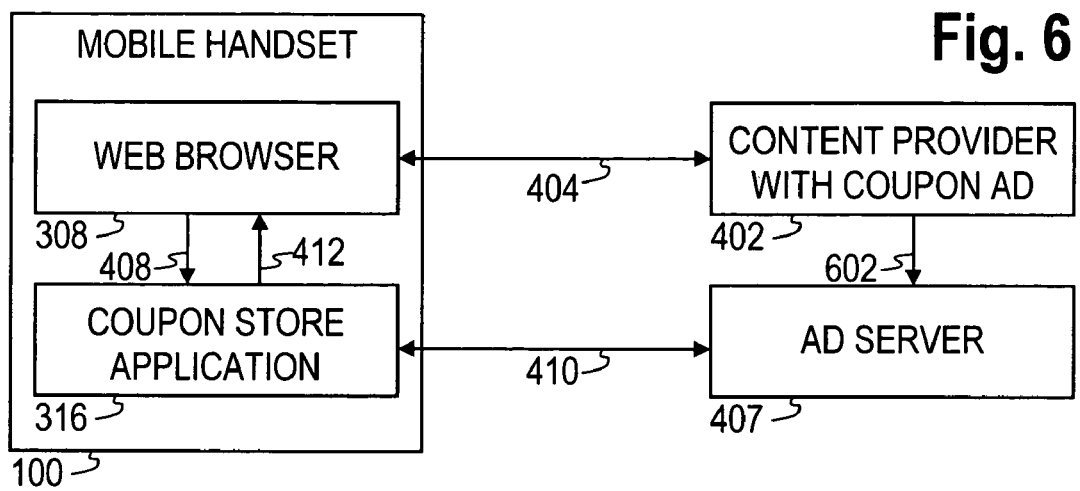
FIG. 6 shows a second system for seamless retrieval of non-standard items to a mobile device.

FIG. 6 shows a second system embodiment for seamless retrieval of non-standard items to a mobile device. There are many similarities between the embodiments. Web browser 308 retrieves a web page from content provider 402 as shown by arrow 404. As before, when the user selects an advertisement or in some fashion requests a coupon, the web browser 308 sends a page request to content provider 402. However, in this embodiment, content provider 402 sends a message 602 directly to ad server 407. The message 602 specifies a user id, a coupon id, and optionally an origination page. Ad server 407 processes the message and stores the specified user id, coupon id, and origination page address in a database table indexed by user id. The content provider 402 also responds to the page request from the browser 308 with a page having an invocation of the coupon store application. The web browser 308 calls the application management system to invoke the specified application, and thereafter the embodiment functions as before.

Figure 7:
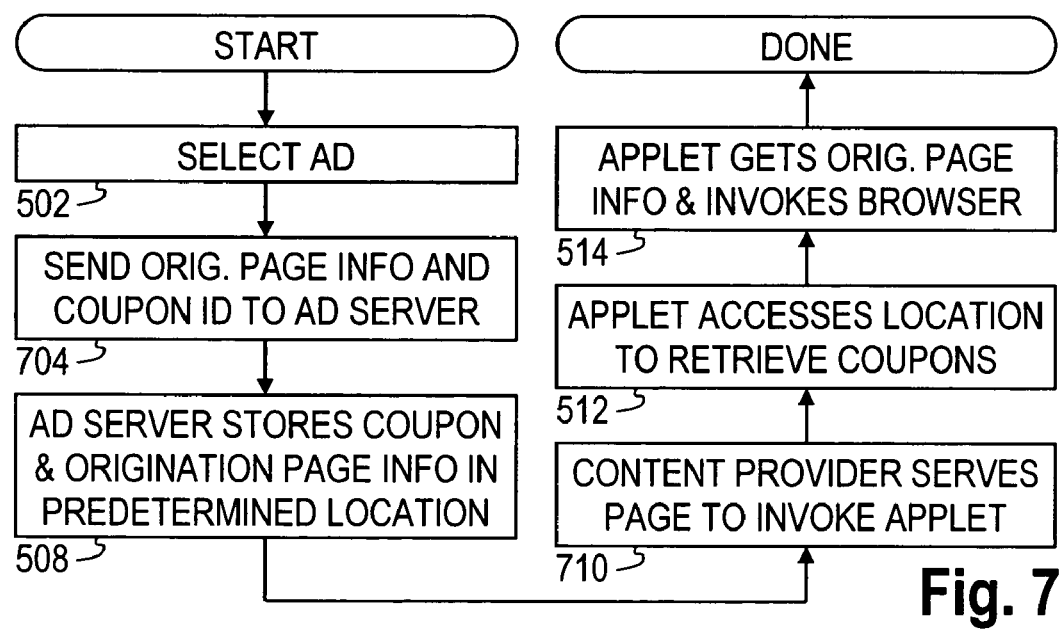
FIG. 7 shows a second method for seamless retrieval of non-standard items to a mobile device.

The foregoing process is shows as a flow diagram in FIG. 7. In block 502, a user selects an advertisement or requests a coupon in some fashion. This action causes the web browser to send a page request to the content provider 402. In block 704 the content provider sends a message with the user id, a coupon id, and origination page information to the ad server. Upon receiving the message in block 508, the ad server stores the coupon and origination page information in a predetermined location, e.g., a database table. In block 710, the content provider 402 sends a response to the page request to the web browser, the response including an invocation of the coupon store application. The web browser transfers control to the coupon store application, which in block 512 retrieves a coupon address and downloads the coupon to a local database in device 100. In block 514 the coupon store application further obtains origination page information from the predetermined location and returns control to the browser with the origination page address as a parameter.

Figure 8:
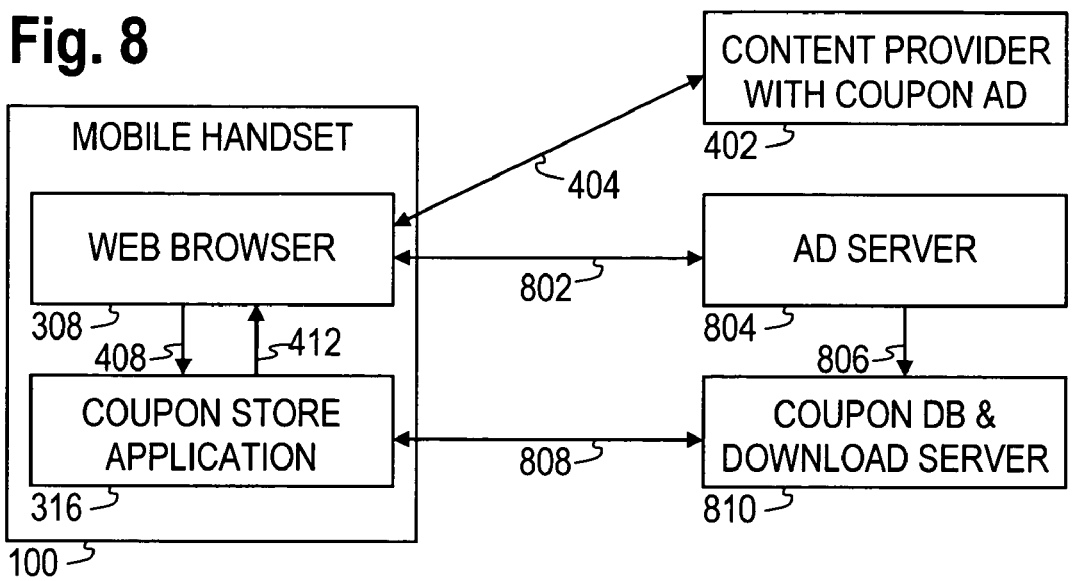
FIG. 8 shows a third system for seamless retrieval of non-standard items to a mobile device.

FIG. 8 shows a third system embodiment for seamless retrieval of non-standard items to a mobile device. As with the first system embodiment, the web browser 308 retrieves a web page from content provider 402 as shown by arrow 404. When the user selects an advertisement or in some fashion requests a coupon, the web browser 308 sends a page request to content provider 402, which logs the request and provides a response that re-directs the web browser to ad server 804. Alternatively, a link associated with the advertisement may cause the web browser to send a page request directly to the ad server 804.

The web browser 308 sends a page request 802 to ad server 804. The page request includes a uniform resource locator (URL) address that, in addition to specifying the address of ad server 804 and a coupon identifier, may also specify an address for the originating web page and may include a user id. The ad server 804 processes the page request to send a message 806 to a coupon database and download server 810. The message 806 specifies a user id, a coupon id, and optionally an origination page. Download server 810 processes the message and stores the coupon and origination page in the database table, indexed with that user id. The ad server 804 responds to the page request from the browser 308 with a page having an invocation of the coupon store application. The web browser 308 calls the application management system to invoke the coupon store application.

Upon receiving the page having the applet invocation, the web browser 308 calls (arrow 408) the application management system 306 with the name of the applet, in this case CouponStore.jar. Most web browsers 308 do not support the passing of parameters to such applets. Upon being invoked, the coupon store application 316 accesses the database table to determine a coupon address, and retrieves (arrow 808) the coupon from download server 810. The coupon store application 316 further obtains the address of the originating page from the download server 810. Once the coupon store application has retrieved the coupon and added the coupon information to the database, the coupon store application calls (arrow 412) the application management system with the name of the browser, passing the originating web page as a parameter. This call causes the web browser to start and load the originating web page, causing the user to perceive the download process as occurring entirely within the web browser.

Figure 9:
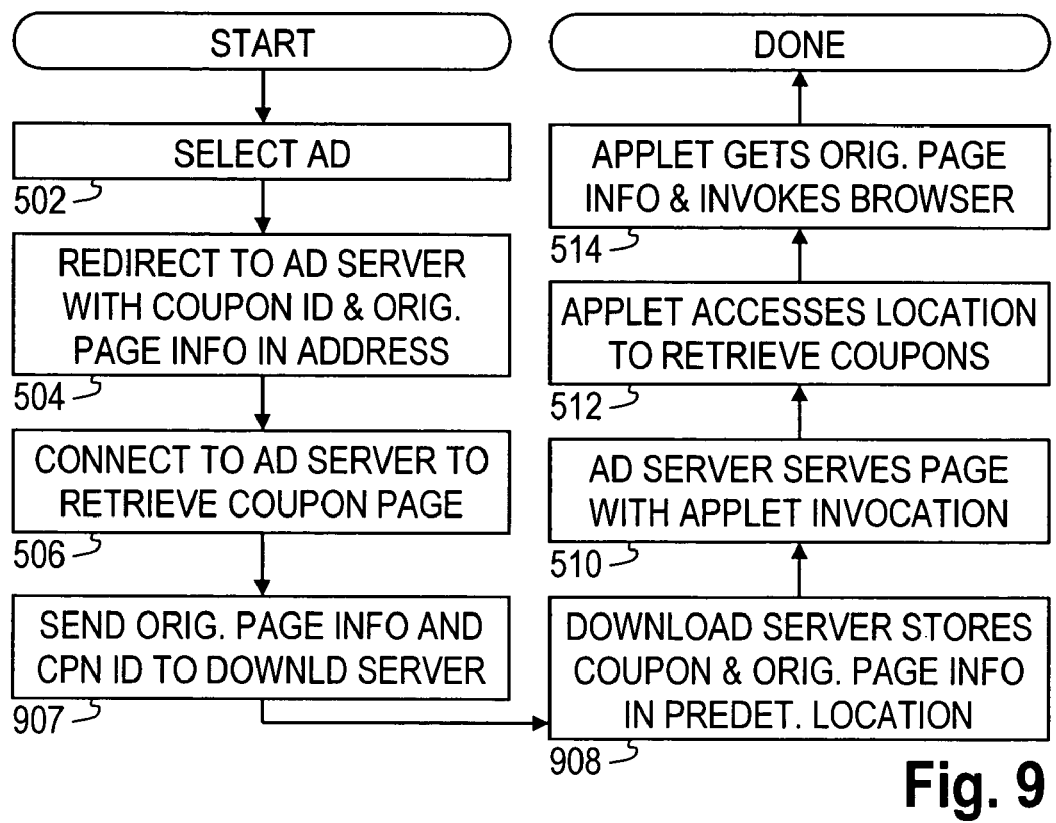
FIG. 9 shows a third method for seamless retrieval of non-standard items to a mobile device.

The foregoing process is shown as a flow diagram in FIG. 9. In block 502, a user selects an advertisement or requests a coupon in some fashion. This action causes the web browser to send a page request to the content provider 402. In block 504 the content provider sends a response, redirecting the web browser to the ad server with a URL that includes a coupon id and origination page info. In block 506, the web browser sends the URL in a page request to the ad server. Upon receiving the page request in block 907, the ad server sends a message to the download server with the user id, the coupon id, and origination page information. In block 908 the download server stores the user id, coupon id or coupon address, and origination page information in a predetermined location, e.g., a database table that is known to the coupon store application on the mobile device. In block 510, the ad server sends a response to the page request to the web browser, the response including an invocation of the coupon store application. The web browser transfers control to the coupon store application, which in block 512 accesses the database table to determine a coupon address, and uses the coupon address to retrieve the coupon from download server 810. In block 514 the coupon store application further obtains origination page information from the database table and returns control to the browser with the origination page address as a parameter. In this manner, a seamless user experience is provided.

The user, upon exiting the browser and executing an electronic wallet application is able to view and use the coupons. The coupons are organized into categories for easy retrieval and usage by the user. In some embodiments, the coupons have associated keyword tags to enable automatic categorization by the coupon store application. In other embodiments, the coupon store queries the user for a category in which to place each newly downloaded coupon.

Though the foregoing description focused on the seamless retrieval and storage of coupons from within a web browser on a mobile device, other items may be similarly retrieved from within a web browser or other applications on a mobile device. It is expected that the present invention will be particularly applicable to retrieving non-standard items that are not expected to be recognized by many browsers.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for enabling seamless retrieval of a coupon with a mobile device comprising a processor and a memory, the method comprising:

receiving at a first external server comprising a processor and a memory a first communication from a web browser on the mobile device, wherein the communication specifies a user identification, a coupon identification, and an origination page address;

using, by a second external server comprising a processor and a memory, the coupon identification to locate coupon location information and storing the coupon location information and the origination page address with the user identification in a database table on the second external server;

in response to the first communication from the web browser, sending a second communication from the second external server to the mobile device, wherein the second communication includes a page that identifies a second application that is external to the web browser and causes the web browser to invoke and transfer control to the second application on the mobile device without passing the coupon location information or the origination page address to the second application; and in response to being invoked, the second application retrieves the coupon location information and the originating page address from the database table, uses the coupon location information to download a coupon to the mobile device, and returns control to the web browser with the origination page address as a parameter.

2. The method of claim 1, wherein the database table has records that are indexed by the user identification.

3. The method of claim 1, wherein the second application is a coupon organizer application that organizes coupons by categories associated with the coupons.

4. The method of claim 1, wherein the first external server is also the second external server.

5. A system for enabling seamless retrieval of a coupon, the system comprising:

a content server comprising a processor and a memory;
a mobile device comprising a processor and a memory the mobile device having a web browser that displays content from the content server as a web page with an advertisement showing the coupon;
an ad server comprising a processor and a memory the ad server configured to receive a first communication from the content server in response to a second communication from the web browser, wherein the second communication specifies a user identification, a coupon identification, and an origination page address;

wherein the ad server is further configured to update a table to associate the coupon identification with coupon location information and store the coupon location information and the origination page address with the user identification in response to the first communication, wherein in response to the second communication from the web browser, the content provider is configured to send a third communication to the mobile device, wherein the third communication includes a page that identifies a second application that is external to the web browser and causes the web browser to invoke and transfer control to the second application stored on the mobile device without passing the coupon location information or the origination page address to the web browser, wherein in response to being invoked, the second application is configured to retrieve the coupon location information and the originating page address from the table, use the coupon location information to download a coupon to the mobile device, and return control to the web browser with the origination page address as a parameter.

6. The system of claim 5, wherein the second application is a coupon organizer application that organized coupons by category.

7. A system for enabling seamless retrieval of a coupon, the system comprising:

a content server comprising a processor and a memory that stores the coupon;
an ad server comprising a processor and a memory;
a mobile device comprising a processor and a memory the mobile device configured to display content from the content server with advertising content from the ad server with a web browser, wherein the advertising content is associated with the coupon; and
a download server comprising a processor and a memory that receives a first communication from the ad server in response to a second communication from the web browser, wherein the second communication specifies a user identification, a coupon identification, and an origination page address;

wherein in response to the first communication, the download server is configured to store coupon location information for the coupon and the origination page address in a database table record associated with the user identification, wherein in response to the second communication from the web browser, the ad server is configured to send a third communication to the mobile device, wherein the third communication includes a page that identifies a second application that is external to the web browser and causes the web browser to invoke and transfer control to the second application without passing the coupon location information or the origination page address to the web browser, and wherein, in response to being invoked, the second application is configured to retrieve the coupon location information and the originating page address from the database table record, use the coupon location information to download the coupon to the mobile device, and return control to the web browser with the origination page address as a parameter.

8. The system of claim 7, wherein the second application causes the origination web page to be displayed upon completion of the download.

9. The system of claim 7, wherein the advertising content is an image in a web page.

10. The system of claim 7, wherein the advertising content is a clip concatenated with a multimedia clip.

11. The method of claim 1 and wherein the web browser is incapable of downloading the coupon.

12. The system of claim 5 and wherein the web browser is incapable of downloading the coupon.

13. The system of claim 7 and wherein the web browser is incapable of downloading the coupon.

* * * * *